United States Patent [19]

Togami

[11] 4,347,112
[45] Aug. 31, 1982

[54] METHOD OF MAKING A RECORDING MEDIUM

[75] Inventor: Yuji Togami, Isehara, Japan

[73] Assignee: Nippon Hoso Kyokai, Tokyo, Japan

[21] Appl. No.: 254,636

[22] Filed: Apr. 16, 1981

Related U.S. Application Data

[62] Division of Ser. No. 82,238, Oct. 5, 1979, Pat. No. 4,293,621.

[30] Foreign Application Priority Data

Oct. 12, 1978 [JP] Japan .................................. 53-125298
May 4, 1979 [JP] Japan .................................. 54-54153

[51] Int. Cl.$^3$ ............................................. C23C 15/00
[52] U.S. Cl. ................................ 204/192 M; 427/131; 427/255.2; 427/255.7
[58] Field of Search ................................ 427/127–132, 427/48, 255.2, 255.7; 428/900, 610, 678, 928; 204/192 M

[56] References Cited

U.S. PATENT DOCUMENTS 3,091,548  5/1963  Dillon ........................... 427/405 X

OTHER PUBLICATIONS

IEEE Trans. on Magnetics, vol. 1, May 11, No. 5, 9-75, Bourne et al., pp. 1332-1334.
Burilla et al., pp. 340-342, AIP Conference 1976.
S. Esho, "Anomalous Magneto-optical Hysteresis Loops of Sputtered Gd–Co Films", Proceedings of the 7th Conference on Solid State Devices, Tokyo, 1975; Supplement to Japanese Journal of Applied Physics, vol. 15, 1976.

*Primary Examiner*—Bernard D. Pianalto
*Attorney, Agent, or Firm*—Stevens, Davis, Miller & Mosher

[57] ABSTRACT

A recording medium consists of a composite amorphous magnetic material layer comprising a rare earth metal and an iron family metal, the composition ratio thereof being nonuniform in the perpendicular direction. Because of the nonuniform composition ratio, a minute magnetic domain can be formed stably, so that thermo magnetic recording at extremely high density and sensitivity can be effected. Where GdFe is employed as a suitable material, the thickness of a portion of the magnetic layer, which portion has a larger perpendicular magnetic anisotropy caused by the nonuniform composition ratio, is increased preferably in comparison with the other portion. Uniform thermo magnetic recording can be performed on the large area medium by covering the same with a transparent dielectric material layer having nonuniform thickness.

6 Claims, 20 Drawing Figures

- Substrate
- I. $Gd_x \cdot Co_{1-x}$
- II. $Gd_y \cdot Co_{1-y}$ $x \neq y, \alpha \leq x, y \leq \beta$

- Substrate
- 1. $Gd_{x_1} \cdot Co_{1-x_2}$
- 2. $Gd_{x_2} \cdot Co_{1-x_2}$
- n. $Gd_{x_n} \cdot Co_{1-x_n}$

- Substrate
- Amorphous Magnetic Layer

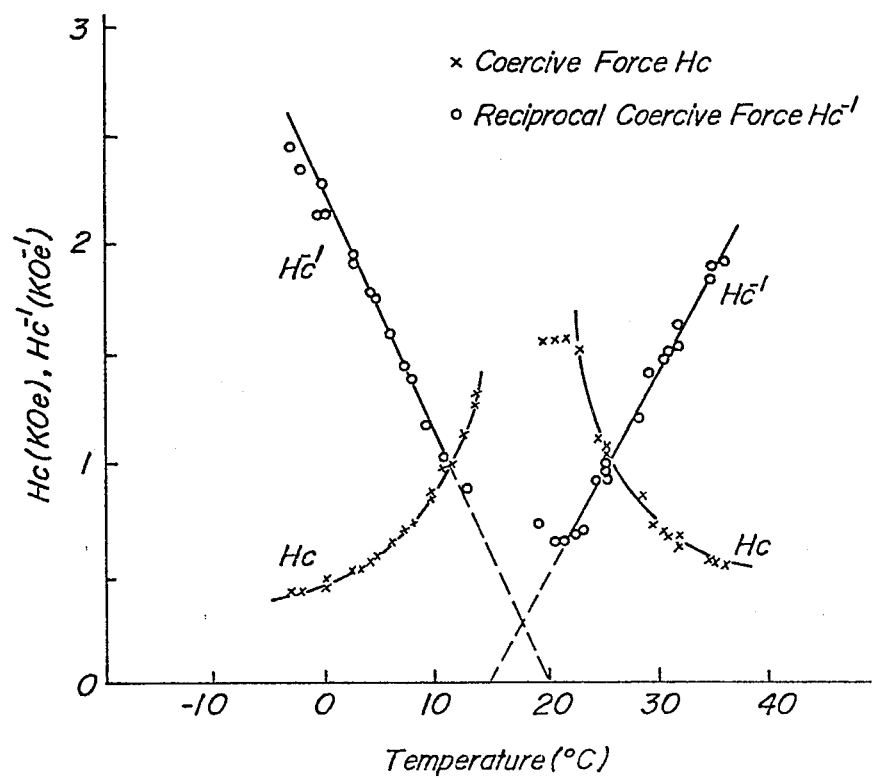

FIG_7a
PRIOR ART
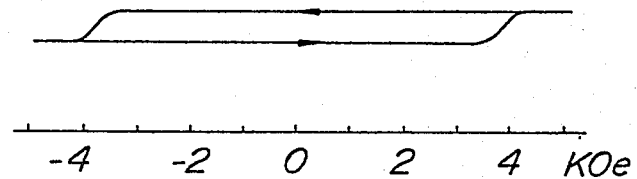
FIG_7b
PRIOR ART
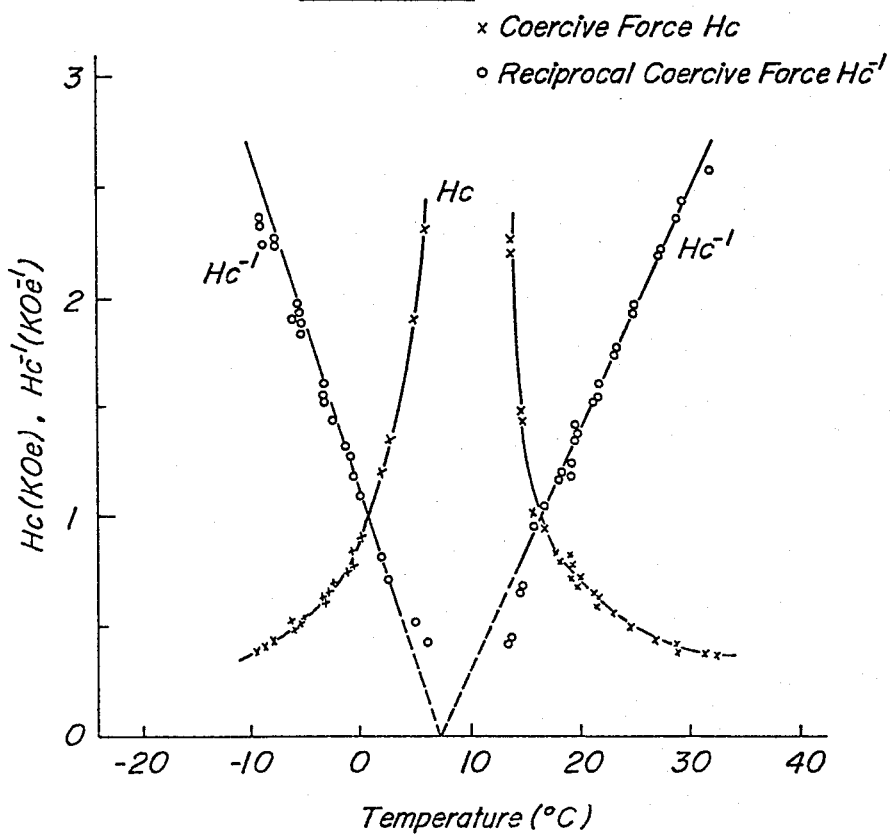

FIG.13
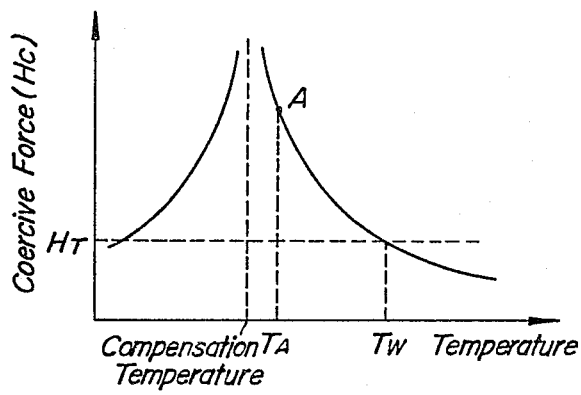
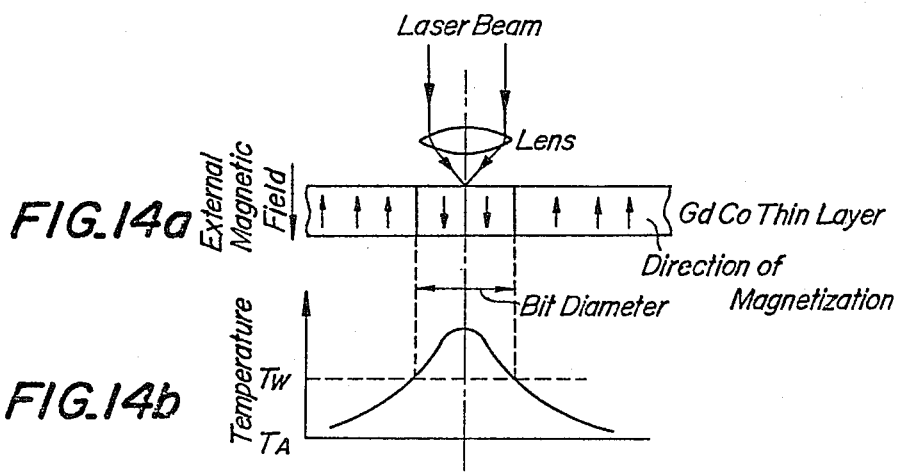
FIG.14a
FIG.14b

METHOD OF MAKING A RECORDING MEDIUM

This is a Division of application Ser. No. 82,238 filed Oct. 5, 1979, U.S. Pat. No. 4,293,621.

BACKGROUND OF THE INVENTION

1Field of the Invention

The present invention relates to a recording medium comprising an amorphous magnetic thin layer consisting mainly of a rare earth metal, and an iron family metal used for thermo magnetic recording to a binary code signal.

2. Description of the Prior Art

A magnetic recording medium, in which a substrate is covered by an amorphous magnetic thin layer consisting of a composite of a rare earth metal and an iron family metal, for example, GdCo, GdFe and the like, has a magnetic anisotropy in the direction perpendicular thereto and exhibits an abrupt change of the coercive force thereof with response to temperature variations near the compensation temperature at which magnetic moments are cancelled by each other between different component materials, so that a magnetic recording medium of this kind is used suitably for high density thermo magnetic recording of a binary code signal.

Where the above mentioned recording medium is used for thermo magnetic recording, numerous benefits can be obtained such as the writing sensitivity of the laser beam is extremely high, and the distinctive Kerr effect is exhibited by the laser beam in the reading-out therefrom, and further the least granular noise is generated on account of the amorphism thereof.

However, on the contrary, a minute magnetic domain formed on the above mentioned recording medium, that is, a recorded bit, which is formed for recording a unit of information, is unstable thermally and magnetically, so that the above mentioned recording medium has a serious defect in that a recorded bit of information is apt to disappear before it is erased intentionally. In other words, it is deficient for high density recording in that to obtain a stably recorded bit of information the diameter of the recorded bit must be larger than a few micrometers.

Furthermore, different structures of the amorphous magnetic thin layer thereof are required respectively for different kinds of the above mentioned materials, namely, GdCo, GdFe and the like. Particularly, it is required to develop a preferable structure of the amorphous magnetic thin layer consisting of GdFe on which a minute stable recorded bit can be obtained, since GdFe has such various industrial merits in comparison with GdCo which is used conventionally. For example, the price of GdFe is lower than about one tenth of that of GdCo and the thin layer consisting of GdFe can be formed easily by conventional evaporation, while that of GdCo can be formed only by sputtering.

On the other hand, to put the above mentioned amorphous magnetic thin layer to practical use as a thermo magnetic recording medium a large area thin layer thereof must be produced. Accordingly, the development of a technique for producing a homogeneous and amorphous magnetic thin layer of large area has been carried out. However, it is well supposed that it is unavoidable in the future also to use practically an amorphous magnetic thin layer having a residual nonhomogeneity to some extent. The most serious difficulty in the practical use of the magnetic thin layer having some nonhomogeneity for the magnetic recording is the unequality of recording sensitivity at different portions of the magnetic thin layer.

For instance, in case of the thermo magnetic recording is performed by the irradiation of a laser beam having a constant power, cylindrical magnetic domains, namely, recorded bits having different diameters are formed at different portions thereof. Regarding a rotating recording disc provided with the magnetic thin layer having the nonhomogeneity only in the radial direction, it is possible to obtain recorded bits having the same diameters at different portions thereof by means of presetting of the intensity of the irradiating laser beam appropriately. However, it is more preferable to apply a compensating means for the unequality of recording sensitivity to the magnetic thin layer itself, because various kinds of nonhomogeneity can be coped with by this compensating means.

Furthermore, when an effective compensating means is employed, it is possible that the allowance of nonhomogeneity of the magnetic thin layer can be increased, so that production of the large area magnetic thin layer is technically easier.

SUMMARY OF THE INVENTION

An object of the present invention is to provide a magnetic recording medium comprising an amorphous thin layer as a recording carrier which is stable magnetically and thermally for recording a binary code signal, even if a diameter of a recorded bit is reduced to smaller than one micrometer.

Another object of the present invention is to provide a magnetic recording medium comprising an amorphous magnetic thin layer consisting mainly of arbitrarily desired kinds of rare earth metals iron family metals, for example, of GdFe which has various industrial merits.

Still another object of the present invention is to provide a thermo magnetic recording medium which can be produced easily so as to have such a uniform recording sensitivity over the whole layer that uniform minute recorded bits can be formed by the irradiation of a laser beam having a constant intensity.

A feature of the present invention is that, in a magnetic recording medium comprising a recording carrier consisting of an amorphous magnetic thin layer which is composed mainly of rare earth metal and iron family metal, the composition ratio thereof is varied stepwise in the perpendicular direction thereto within such a range that magnetic recording can be effected.

Another feature of the present invention is that, in the above mentioned kind of magnetic recording medium which comprises plural magnetic layers provided with the magnetic anisotropy in the perpendicular direction thereto, the thickness of one of those amorphous magnetic thin layers which has a larger perpendicular magnetic anisotropy is increased in comparison with that of another layer which has a smaller perpendicular magnetic anisotropy.

Still another feature of the present invention is that, in the above mentioned kind of magnetic recording medium, the compensation of the nonuniform recording sensitivity in the thermo magnetic recording which is caused by the nonhomogeneity of the magnetic thin layer is effected by covering the magnetic thin layer with a dielectric material layer which has a thickness which is varied with response to the nonhomogeneity thereof.

BRIEF DESCRIPTION OF THE DRAWINGS

FIGS. 5(a) and (b) are graphs showing examples of magnetic performances of the recording medium according to the present invention respectively;

FIG. 6 is a graph showing examples of characteristic curves of the recording medium according to the present invention;

FIGS. 7(a) and (b) are graphs showing respectively examples of a magnetic performance and characteristic curves of the conventional amorphous magnetic material;

FIG. 13 is a graph showing a thermal performance of a coercive force of a thin layer of GdCo;

FIGS. 14(a) and (b) are a schematic cross-sectional view showing a state of irradiation of a laser beam on the thin layer of GdCo and a graph showing a distribution characteristics of the compensation temperature thereof respectively;

DESCRIPTION OF THE PREFERRED EMBODIMENTS

The preferred embodiments of the present invention will be explained in detail by referring to the above drawings hereinafter.

In the first place, the magnetic performance of this kind of amorphous magnetic thin layer will be explained with regard to gadolinium-cobalt, that is, GdCo as an example.

Figure 1:
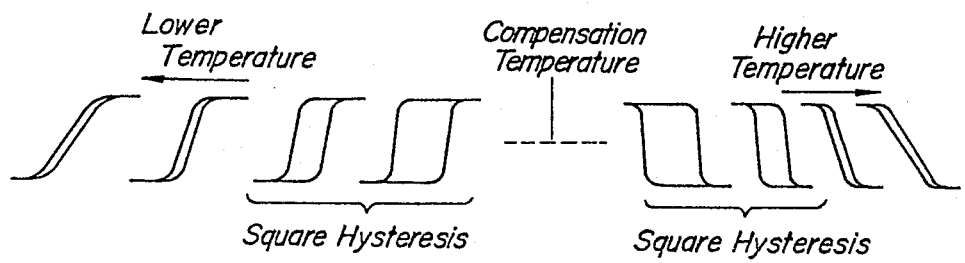
FIG. 1 is a graph showing magnetic performances of a conventional amorphous magnetic material.

The compensation temperature of GdCo is determined by the composition ratio between gadolinium Gd and cobalt Co, and further respective forms of hysteresis characteristics curves of the thin layer of GdCo in the higher temperature range and the lower temperature range, which ranges are bordered on each other by the above compensation temperature thereof, are quite different from each other as shown in FIG. 1. Regarding the characteristics curves shown in FIG. 1, which are obtained by utilizing the polar Kerr effect, the temperature ranges in which square hysteresis curves can be obtained correspond to those in which the thermo magnetic recording can be effected. On the contrary, because the compensation temperature is determined by the composition ratio as mentioned above, the range of the composition ratio required for obtaining those desired square hysteresis curves can be determined by the predetermined temperature at which the thermal magnetic recording is carried out. Accordingly, when the composition of the magnetic recording medium of GdCo is represented by $Gd_xCo_{1-x}$ and $\alpha$ and $\beta$ are assumed as constants, these constants $\alpha$ and $\beta$ can be determined in such a way that the square hysteresis curve can be obtained within the range of $\alpha \leq x \leq \beta$.

The feature of the present invention is that the magnetic recording carrier consists of laminated amorphous magnetic thin layers, the composition ratios of which are varied respectively within the range in which square hysteresis curves can be obtained respectively, so as to stabilize minute magnetic domains in which unit informations are recorded respectively.

Although it is mentioned above that plural amorphous thin layers having respectively varied composition ratios are laminated with each other, it is sufficient for the feature of the present invention that the composition ratio of the magnetic carrier consisting of the amorphous magnetic layer is varied in the perpendicular direction thereto, that is to say, it is not necessary to vary the composition ratio thereof stepwise, so as to form the laminated structure. Accordingly, it is possible to vary the composition ratio thereof gradually, and further it is possible also to vary the composition ratio thereof gradually and stepwise at the same time.

Figure 2:
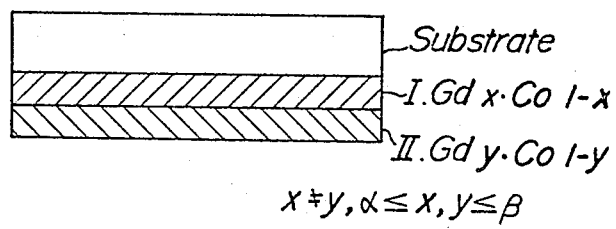
FIG. 2 is a schematic cross-sectional view showing an embodiment of a recording medium according to the present invention.
Figure 3:
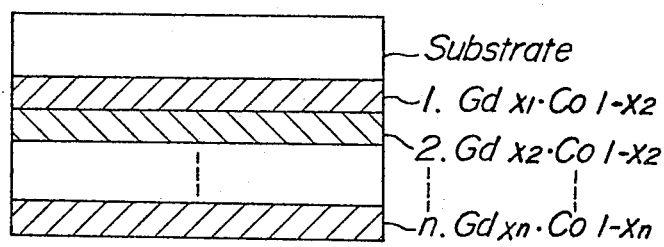
FIG. 3 is a schematic cross-sectional view showing another embodiment of the recording medium according to the present invention.

FIG. 2 shows an example of the recording medium according to the present invention, which has the laminated structure consisting of two thin layers so as to vary the composition ratio stepwise, and FIG. 3 shows another example which has also the laminated structure consisting of more than three thin layers.

Figure 4:
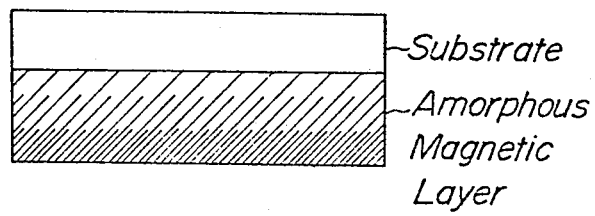
FIG. 4 is a schematic cross-sectional view showing an example similar to the recording medium according to the present invention.

On the other hand, FIG. 4 shows still another example in which the composition ratio of the amorphous magnetic thin layer is varied gradually in the perpendicular direction thereto.

In the next place, the method for producing the magnetic recording medium according to the present invention in which the composition ratio of the amorphous magnetic thin layer as mentioned above will be explained.

In case the amorphous magnetic thin layer is produced by the sputtering method as an example, it is possible theoretically that the amorphous thin layer is formed by replacing plural kinds of sputtering targets having respectively different composition ratios of the composite magnetic material, for instance, the composition of gadolinium Gd and cobalt Co under the predetermined condition of the sputtering. However, it is preferable for producing the above mentioned magnetic recording medium conveniently that the composition ratio of the formed amorphous magnetic thin layer is varied in the perpendicular direction thereto by varying the amount of the sputtering current in the sputtering process with use of only one kind of sputtering target having an adequate composition ratio.

For instance, where the example shown in FIG. 2 is formed by the above mentioned sputtering process, at the first the first magnetic layer having the thickness of 1,000 Å is deposited on a substrate by settling the sputtering current to 108 mA, and then the second magnetic layer having the thickness of 1,000 Å also is deposited on the first magnetic layer by settling the sputtering current to 123 mA. As a result thereof, the composition ratio of the first magnetic layer is about 0.21:0.79 and that of the second magnetic layer is about 0.212:0.788, so that a desired amorphous magnetic thin layer which is suitable for forming stably recorded minute magnetic domains can be obtained. On the other hand, in the example shown in FIG. 4, is formed by the above mentioned sputtering process, the sputtering current is varied gradually from the initial amount of 118 mA to 113 mA, so as to vary the composition ratio of the formed amorphous magnetic thin layer having the same thickness with the above continuously.

FIGS. 5(a) and (b) show the hysteresis characteristics curves which are measured on the above mentioned examples of the amorphous magnetic thin layer having the thickness of 2,000 Å, the composition ratios thereof being varied in the perpendicular direction thereto as shown in FIGS. 2 and 4 respectively.

As shown by these hysteresis curves, with the amorphous magnetic thin layer having the composition ratio varied in the perpendicular direction thereto according to the present invention, an ordinary form of the hysteresis curve as shown in FIG. 1 can not be obtained, but an extremely irregular form of the hysteresis curve is obtained. However, it can be understood that the presentation of this irregular form of the hysteresis curve certifies the appearance of the nonuniformity of the composition in the perpendicular direction which nonuniformity is required for stabilizing the recorded minute magnetic domains. Although the theory is not yet fully understood, it can be recognized that the instability of the recorded minute magnetic domain which is formed in the conventional amorphous magnetic thin layer consisting of GdCo and the like is caused by the fact that the domain wall, by which the minute magnetic domain is bordered, is formed as a cylinder which stands in the homogeneous amorphous magnetic material, so that the domain wall is apt to be shifted by the variation of the thermal or magnetic situation and consequently the recorded magntic domain cannot be bordered stably by the shifted domain wall.

In contrast therewith, the cylindrical domain wall which is formed in the nonhomogeneous amorphous magnetic material according to the present invention is provided with increased magnetic resistance, so that the domain wall acts as if formed of so-called concrete, while the above mentioned conventional domain wall acts as if formed of so-called mortar. As a result thereof, the domain wall according to the present invention can endure preferably against the variation of the thermal or magnetic situation and consequently the recorded magnetic domain can be bordered stably by the partient domain wall.

Apparent from the mentioned above, regarding the manner of variation of the composition ratio in the amorphous magnetic thin layer according to the present invention, it is enough to give an appropriate nonhomogeneity to the amorphous magnetic thin layer. Accordingly it is not required necessarily to vary the composition ratio of the amorphous thin layer stepwise or gradually only in one direction as shown in FIGS. 2 to 4. That is, it is possible to increase and decrease the composition ratio repeatedly in the perpendicular direction. Moreover, it is enough also to settle the degree of variation of the composition ratio to such a small range about from 0.1 to 0.3% with response to the size of the minute magnetic domain. Furthermore, it is possible also for giving the above nonhomogeneity to the produced amorphous magnetic thin layer to vary the sputtering current gradually in an unstable state of the sputtering process and to vary the vaporizing velocity of the source of evaporation appropriately in the evaporation process.

FIG. 6 shows the temperature characteristics of the coercive force Hc and the reciprocal $Hc^{-1}$ thereof of the magnetic recording medium according to the present invention as shown in FIG. 2 which are measured by utilizing the polar Kerr effect. As evident therefrom, two different compensation temperatures at which the reciprocal $Hc^{-1}$ become zero in the higher and lower temperature ranges respectively can be obtained, so as to certify that the above magnetic recording medium comprises two different layers which have different compensation temperatures respectively.

FIGS. 7(a) and (b) show respectively the hysteresis curve and the coercive force Hc and the reciprocal $Hc^{-1}$ thereof of the homogeneous amorphous magnetic thin layer having the same thickness of 2,000 Å which is produced by maintaining an exactly constant sputtering current in the conventional sputtering process. As evident therefrom, the conventional ordinary form of the hysteresis curve can be obtained only by maintaining the constant sputtering current in the same condition of the sputtering as that according to the present invention. Furthermore, the temperature characteristics of the reciprocal $Hc^{-1}$ of the coercive force of the magnetic recording medium according to the present invention is crossed with the axis of zero $Oe^{-1}$ at two different points, while that of the conventional homogeneous amorpyous magnetic thin layer is crossed with the axis of zero $Oe^{-1}$ at only one point as shown in FIG. 7(b), so as to present the uniformity of the composition ratio thereof.

By the way, it is a matter of course that it is the premise for the stabilization of the recorded minute magnetic domain according to the present invention that the variation of the composition ratio of the amorphous magnetic thin layer is caused in such a depth as the magnetic variation is caused by the recording process.

The above mentioned effect of the present invention which is obtained by varying the composition rato in the perpendicular direction of the amorphous magnetic thin layer can be clarified by the following Table 1 which shows the results of experiments in which the stability of the recorded domain is tested regarding the sample (A) as shown in FIG. 2, the sample (B) as shown in FIG. 4 and the sample (C) as shown in FIG. 7.

TABLE 1

| Samples | Stability against magnetic variation | Stability against temperature variation |
|---|---|---|
| (A) | Stable<br>A recorded domain disappears under the application of reverse magnetic field of more than 350 Oe on a domain of 1 μm diameter. | Stable<br>A recorded domain is stable under the temperature variation from −'° C. to 60° C. |
| (B) | Stable<br>A recorded domain disappears under the application of reverse magnetic field of more than 280 Oe on a domain of 1 μm diameter. | Stable<br>The same with the above |
| (C) | Unstable<br>It is impossible to record on a domain having a diameter of less than 3 μm.<br><br>A reverse magnetic field is not required for the disappearance of a recorded domain. | Unstable<br>A recorded domain disappears under the temperature variation of ±10° C. |

The formation of the recorded domain on those samples is performed in such a way that a magnetic domain is formed on those samples respectively by irradiating a laser beam having an adequate intensity in a short time with the aid of a bias magnetic field of 90 Oe which is reduced gradually after the irradiation of the laser beam.

A recorded minute domain having a diameter less than 3 μm on the sample (C) which is produced by the conventional process can not be maintained stably regardless of the aid of the bias magnetic field of 90 Oe, and further another recorded domain thereon having a diameter of about 3 μm disappears by removing the externally applied magnetic field or by varying the room temperature, for instance, by the variation of ±10° C.

On the other hand, a minute domain having a diameter of 1 μm can be recorded easily on the samples (A) and (B) which are produced according to the present invention, and further can be maintained stably regardless of the removement of the externally applied magnetic field and does not disappear unless a fairly intense reverse magnetic field is applied thereon.

By the way, the above difficulty of disappearance under the application of the reverse magnetic field does not mean the difficulty of practical erasure of the recorded domain, because it can be erased easily by the irradiation of laser beam under the application of a slight reverse magnetic field.

The above mentioned minute domain recorded on the samples (A) and (B) according to the present invention presents such an excellent stability against the temperature variation as the recorded domain does not disappear at all under the temperature variation in a range from −40° C. to +60° C.

By the way, with regard to the recording sensitivity and the output reproduced by the polar Kerr effect, no difference is noticed among these samples (A), (B) and (C), and any defect accompanied with the variation of the composition ratio in the amorphous magnetic thin layer according to the present invention can not be noticed at all at least regarding the thermo magnetic recording thereon.

Under the investigation of the results of similar experiments which are carried out on various kinds of amorphous magnetic thin layers according to the present invention, the following fact can be noticed.

Although the desired performance can be obtained easily by varying the composition ratio of the GdCo layer comprising two thin layers having the same thickness, the preferable performance cannot be obtained by the GdFe layer provided with the similar structure therewith.

However, the similar desired performance can be obtained almost easily by varying both of the composition ratio and the thickness between two thin layers forming the GeFe layer.

By referring to the above fact, the difference of the structure of the amorphous magnetic layer required for obtaining the desired performance being preferable to the high density thermal magnetic recording has been investigated with regard to various kins of amorphous magnetic materials. As a result of this investigation, it can be understood that the above mentioned difference of the stability of the recorded domain between the GdCo layer and the GdFe layer both of which consist of two thin layers having the same thickness is caused by the difference of the origin of generation of the magnetic anisotropy in the direction perpendicular to the amorphous magnetic thin layers between those two kinds of magnetic materials. That is, the perpendicular magnetic anisotropy of the GdCo layer seems to be caused by the re-sputtering effect performed by the argon (Ar) ion contained in the sputtering atmosphere used for producing the GdCo layer by the sputtering process, while the perpendicular magnetic anisotropy of the GdFe layer can be recognized to be caused by the inner stress generated in the amorphous magnetic layer. So that, it can be assumed that the interaction of those inner stresses between two adjacent thin layers is caused near the border face therebetween. As a result thereof, the anisotropy constant Ku of one of these two thin layers is reduced by the interaction of those inner stresses in comparison with that of a single layer, and then the perpendicular magnetic anisotropy of the thin layer having the larger anisotropy constant Ku is increased.

Furthermore, it is well known that, generally speaking, the recorded domain formed on the magnetic thin layer becomes more stable according to the increase of the wall coercive force Hw, which is defined by the following equation.

$$Hw = \frac{1}{2Ms} \cdot \frac{\delta \sigma W}{\delta X} \qquad (1)$$

where, Ms represents the saturated magnetization, σw represents the wall energy, X represents the Co-ordinate showing the position on the thin layer.

The wall energy σw can be defined by the following equation.

$$\sigma w = 4(AKu)^{\frac{1}{2}} \qquad (2)$$

where, A is a commutative integration constant.

So that, the above equation (1) can be rewritten as follows.

$$Hw = \frac{2}{Ms}\left(\sqrt{Ku} \cdot \frac{\delta\sqrt{A}}{\delta X} + \sqrt{A} \cdot \frac{\delta\sqrt{Ku}}{\delta X}\right) \quad (3)$$

Accordingly, it can be assumed that the term $\delta\sqrt{A}/\delta X$ of the above equation (3) is increased by the laminated structure of the magnetic layer, and further it can be assumed also that the stability of the recorded domain is reduced by the decrease of the wall coercive force Hw according to the decrease of the anisotropy constant Ku.

According to the above mentioned orgin of generation of the perpendicular magnetic anisotropy, it can be understood that the recorded domain formed on the amorphous magnetic thin layer consisting of GdFe can not be stabilized by the laminated structure thereof as quite different from that consisting of GdCo.

Figure 8:
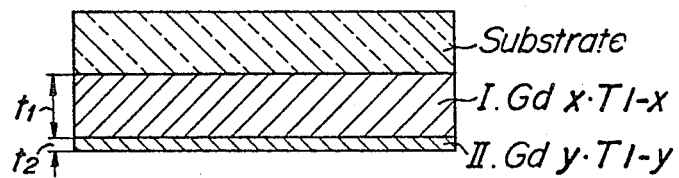
FIG. 8 is a schematic cross-sectional view showing further another embodiment of the recording medium according to the present invention.

On the other hand, it is not clear whether the anisotropy constant Ku is increased by the application of tensile stress or compressive stress. However, when one of the two thin layers laminated on each other in the amorphous magnetic layer is applied with tensile stress, the other is applied with compressive stress, so that when the anisotropy constant Ku of one of these two thin layers is increased, that of the other should be decreased. Consequently the stabilization of the recorded minute domain formed on the amorphous magnetic layer consisting of GdFe can be performed by the increase of the volume, namely the thickness of one thin layer having the increased anisotropy constant in comparison with that of the other thin layer as shown in FIG. 8, that is to say, by means of reducing the effect applied on the wall coercive force by the decrease of the anisotropy constant Ku in one of the two thin layers laminated on each other.

The above mentioned variation of the anisotropy constant in the amorphous magnetic thin layer does not apply only a serious effect on the stabilization of the recorded domain, but another serious effect on the reading out of the domain recorded by utilizing the laser beam. That is, the reading out of the recorded domain is carried out usually by utilizing the polar Kerr effect under the irradiation of the laser beam, so that the read output is increased according to the increase of the perpendicular magnetic anisotropy in the magnetic thin layer, and contrarily the read output is decreased by the generation of anisotropic components caused by the decrease of the perpendicular magnetic anisotropy in the magnetic thin layer. Accordingly, the above mentioned increase of the thickness of one of the laminated thin layers in which the anisotropy constant Ku is increased is extremely useful for both writing and reading on the amorphous magnetic layer provided with the laminated structure. Furthermore, it is preferable for reading out to irradiate by the laser beam one of the laminated thin layers which has the increased anisotropy constant.

According to the investigation carried out by utilizing the Kerr effect under the irradiation of the laser beam, it is clarified that the anisotropy constant Ku is increaed in one of two thin layers laminated on each other in the GdFe layer which one has the higher compensation temperature. Accordingly, it is preferable for reading out the recorded domain formed on the magnetic recording medium consisting of GdFe under the irradiation of the laser beam through the glass substrate thereof to dispose one of plural thin layers laminated on each other therein on the glass substrate directly in wich one the thickness $t_1$ is relatively increased according to the increased anisotropy constant Ku, and further the compensation temperature is raised relatively according to the relatively increased composition ratio x of Gd in the GdFe layer, as shown in FIG. 9.

Figure 9:
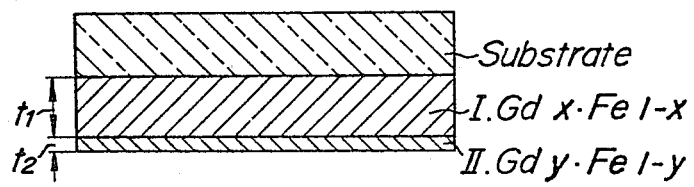
FIG. 9 is a schematic cross-sectional view showing still further another embodiment of the recording medium according to the present invention.

FIG. 9 shows an example of the magnetic recording medium according to the present invention which comprise two amorphous magnetic thin layers laminated on each other.

Figure 10:
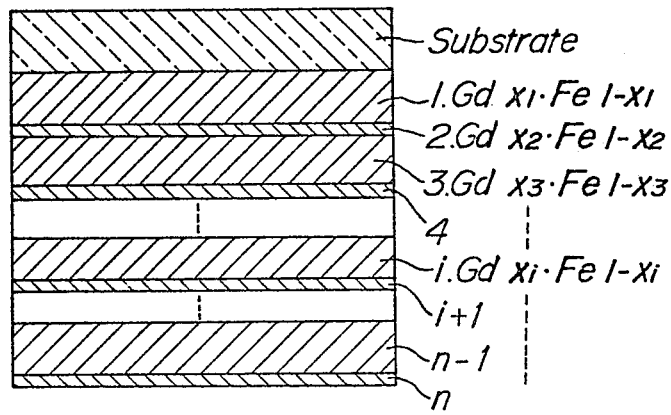
FIG. 10 is a schematic cross-sectional view showing still further another embodiment of the recording medium according to the present invention.

However, it is naturally possible that three or more magnetic thin layers can be laminated successively as shown in FIG. 10.

In the magnetic recording medium comprising n thin layers laminated successively as shown in FIG. 10, one kind of amorphous magnetic thin layer having the increased thickness based on the increased anisotropy constant Ku and the other kind of amorphous magnetic thin layer having the decreased thickness based on the decreased anisotropy constant Ku are laminated alternately, the former being disposed directly on the glass substrate thereof, and further, in case i is an odd number, regarding the composition ratio $X_i$ of Gd in the i-th layer $X_{i-1} < X_i$ and $X_{i+1} < X_i$, and in case j is an even number, regarding the composition ratio $X_j$ of Gd in the j-th layer $X_{j-1} > X_j$ and $X_{j+1} > X_j$. Moreover, it is possible to vary the composition ratio either stepwise or gradually near the border of these two kinds of thin layers.

In the amorphous magnetic thin layer in which the stably recorded minute domain can be obtained according to the present invention, the usual benefit of the amorphous magnetic layer that the recorded information can be rewritten is not injured at all. That is, it is possible in this amorphous magnetic thin layer according to the present invention also that a recorded information bit is erased by irradiating the laser beam again under the application of the bias magnetic field, and then another information bit is recorded clearly at the same position.

Figure 11:
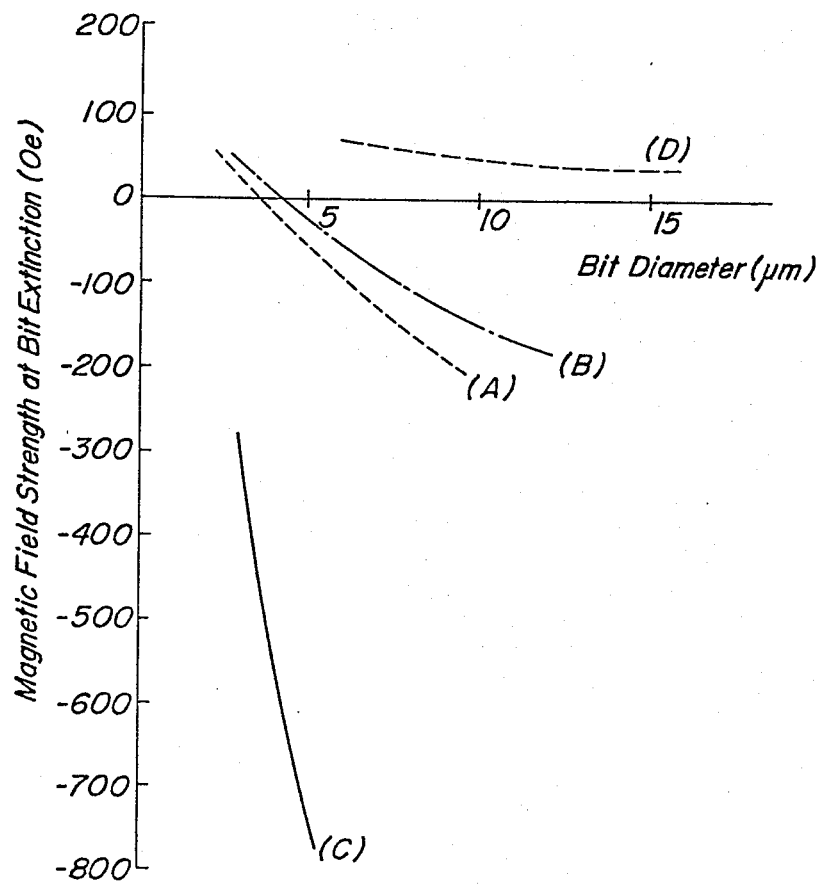
FIG. 11 is a graph showing examples of magnetic performances of the recording medium according to the present invention in comparison with those of a conventional magnetic recording medium.

The above mentioned effect of stabilization of the recorded domain formed on the GdFe layer having such a structure as shown in FIG. 9 can be explained on the strength of the experimental result as shown in FIG. 11.

In FIG. 11 which shows the characteristics curves obtain by experiment, the diameter of the information bit formed by the irradiation of the laser beam is presented on the abscissa thereof and the strength of the bias magnetic field applied for aiding the recording of the information bit under the irradiation of the laser beam is presented on the ordinate thereof in such a state that the recorded information bit is just erased according to the gradual decrease thereof, and further, in the region in which the strength of the bias magnetic field is negative, the result of such a process is shown that the strength of the applied magnetic field having the reverse polarity is varied, so that such a result that the recorded bit is unstable is shown in the upper right region of FIG. 11, and contrarily such a result that the recorded bit is stable is shown in the lower left region.

Figure 12:
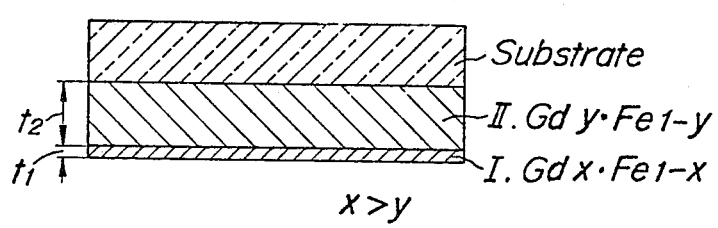
FIG. 12 is a schematic cross-sectional view showing further still another embodiment of the recording medium according to the present invention, the structure of which is the reverse of that shown in FIG. 9.

The curve (A) shows the performance of a sample of the GdFe layer which consists of a single layer having the thickness of 1,600 Å, and the curve (B) shows that of another sample thereof which consists of two thin layers having the same thickness $t_1$, $t_2$ of 800 Å respectively, and the curve (C) shows that of still another sample thereof which consists of two thin layers having different thickness $t_1$, $t_2$ respectively, for instance, as $t_1=1,400$ Å and $t_2=200$ Å as shown in FIG. 9, and the curve (D) shows that of further another sample thereof which consists of two thin layers having contrarily different thickness $t_1$, $t_2$ in comparison with those shown in FIG. 9, for instance, as $t_1=200$ Å and $t_2=1,400$ Å as shown in FIG. 12, one of these two thin layers which has the decreased anisotropy constant Ku being disposed directly on the glass substrate and the laser beam being irradiated thereon from the opposite side.

According to the comparison of these curves (A), (B), (C) and (D) with each other, it can be understood clearly that the curve (C) of the sample according to the present invention presents such an evident and remarkable effect that an extremely stable information bit can be recorded on the amorphous magnetic thin layer, even though it consists of GdFe.

By the way, in the production process carried out for obtaining those samples shown in FIG. 11, an amorphous magnetic thin layer having the higher compensation temperature can be obtained according to the higher pressure of argon gas in the evaporation atmosphere used for producing those samples, the variation of which pressure is utilized for varying the composition ratio in those samples.

In the next place, another feature of the present invention for uniformizing the recording sensitivity of the thermo magnetic recording will be explained.

At first, the temperature dependency of the coercive force Hc of the GdCo thin layer as an example is shown in FIG. 13, because the thermo magnetic recording on the GdCo thin layer is carried out in such an apparatus, as shown in FIG. 14, by utilizing the abrupt decrease of the coercive force which decrease is caused by the irradiation of the laser beam in the temperature range beyond the compensation temperature at which the maximum value of the coercive force can be obtained as shown in FIG. 13.

In case the temperature $T_A$ corresponding to the point A on the curve of the coercive force shown in FIG. 13 is assumed to be the room temperature at which the recording is carried out and the GdCo layer is irradiated by the focused laser beam as shown in FIG. 14(a), the temperature distribution as shown in FIG. 14(b) is caused in the GdCo layer, which is applied with such an external magnetic field so as to facilitate the generation of a cylindrical magnetic domain provided with the magnetization of reverse polarity. In the temperature range beyond the temperature $T_w$ within which range the relation of Hc<HT between the coercive force Hc and the sum HT of the strengthes of the external magnetic field applied on the GdCo layer and the reverse magnetic field generated therein, the polarity of magnetization thereof can be reversed as shown in FIG. 14(a), so as to effect the recording of information bit.

Figure 15:
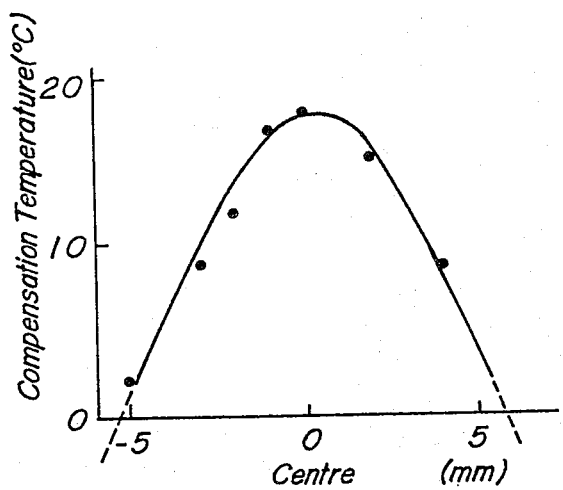
FIG. 15 is a graph showing an example of a distribution characteristics of the compensation temperature of the thin layer of GdCo.

However, the compensation temperature of the GdCo layer is varied with response to the variation of the composition ratio between Gd and Co, and further in the GdCo thin layer formed from a homogeneous alloy target in the sputtering process, the composition ratio in the central portion thereof which is opposed to the alloy target becomes usually larger than that in the peripheral portion thereof, so that the compensation temperature thereof is varied according to the position thereof, as shown in FIG. 15.

By the way, the compensation temperature performance shown in FIG. 15 is obtained by the practical measurement carried out on the GdCo thin layer formed from the sputtering alloy target having the diameter of 30 mm and separated from the substrate by 40 mm, which layer is employed as an example of poor homogeneity.

In company with the above variation of the compensation temperature of the magnetic thin layer according to the position thereon, the form and the size of the region thereof in which the above mentioned relation of Hc<HT can be obtained, so that the diameter of the recorded bit is varied as mentioned early.

The above ununiformity of the diameter of the information bit formed on the magnetic thin layer by the irradiation of the laser beam is an extremely serious defect for the high density recording.

Figure 16:
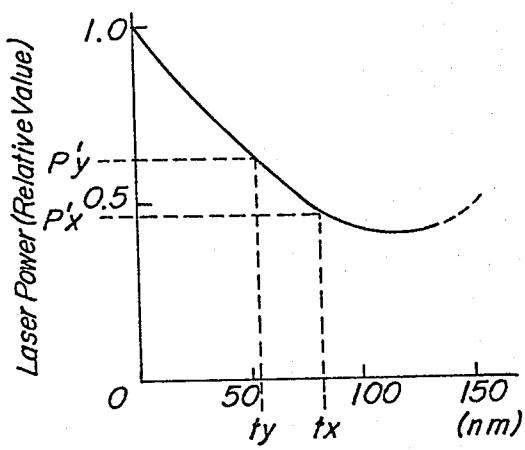
FIG. 16 is a graph showing an example of the relation between the thickness of a dielectric material layer according to the present invention and the laser power required for recording thereon.

On the other hand, it is carried out usually to cover the produced magnetic thin layer with a transparent dielectric thin layer in order to reduce the effect of oxidation, to increase the Kerr rotation angle, to reduce the effect of dust and flaw and so on. The present inventor noticed that the recording sensitivity of the magnetic thin layer is varied with response to the thickness of the above dielectric thin layer covering it. FIG. 16 shows the result of the experiment carried out for certifying the above notice.

In the graph showin in FIG. 16, the ordinate thereof represents the recording sensitivity defined by the least laser power required for recording the information bit, and the variation of the sensitivity with response to the thickness of the dielectric thin layer can be assumed to be caused by the repeated interference of the laser beam inside of the dielectric thin layer.

The appropriate adjustment of the thickness of the above dielectric thin layer covering the magnetic recording layer for unifying the recording sensitivity thereof is extremely easier than the early mentioned unification of the composition ratio thereof, as a technical process. For instance, in case the composition ratio of Gd and Co is varied only in the radial direction of the circular magnetic thin layer, the appropriate variation of the thickness in the radial direction of the circular dielectric layer which covers the GdCo layer can be effected easily by keeping the evaporation source of dielectric material apart from the GdCo layer by a suitable distance, so as to compensate the ununiformity of the recording sensitivity of the GdCo layer approximately. Furthermore, in case the variation of the composition ratio of Gd and Co is distributed in a complicated state on the GdCo layer, the suitable distribution of the variation of the thickness of the compensating dielectric layer can be obtained by means of shifting the evaporation mask having a suitable form with response to the distributed variation of the composition ratio.

Figure 17:
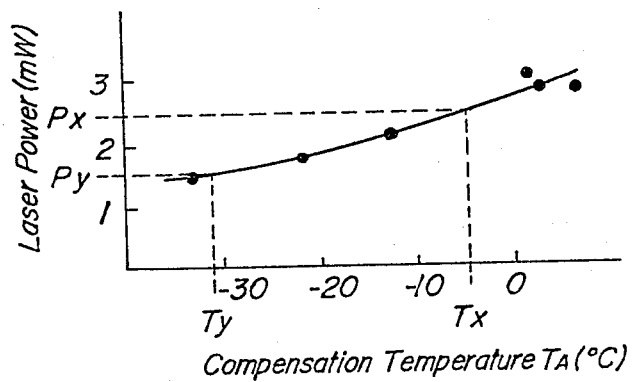
FIG. 17 is a graph showing an example of the state of the variation of the required laser power which variation is caused by the variation of the compensation temperature of the thin layer of GdCo.

FIG. 17 shows an example of the required recording laser power varied with response to the variation of the compensation temperature of the magnetic thin layer. Apparently from the characteristics curve shown in FIG. 17, the uniformity of the overall recording sensitivity of the magnetic recording medium consisting of the magnetic thin layer covered with the transparent dielectric thin layer can be obtained easily by means of forming the dielectric layer as follows.

In order to compensate the difference between the compensation temperature TX in the central portion of the GdCo thin layer and that TY in the peripheral portion thereof, that is, t correct the nonuniformity of the recording sensitivity thereof caused by the above difference, two points PX′, PY′ are plotted on the ordinate of the characteristic curve shown in FIG. 16, which points PX′, PY′ correspond to two points PX, PY on the ordinate of the curve shown in FIG. 17 respectively and regarding which points PX′, PY′ the relation of PX.PX′=PY.PY′ can be obtained, and then two points tX, tY corresponding to those points PX′, PY′ respectively are plotted on the abscissa of the curve shown in FIG. 16. As a result thereof, these points tX, tY correspond respectively to the points TX, TY on the abscissa of the curve shown in FIG. 17 which points TX, TY represent the above compensation temperature respectively, so that the circular dielectric layer having the thickness tX on the central portion thereof and the thickness tY on the peripheral portion thereof can compensate the above mentioned difference of the compensation temperatures. By the way, these required thickness of the dielectric layer can be obtained by the above mentioned evaporation techniques.

Apparently from the mentioned above, the effect of the variation of the composition ratio of the composite amorphous magnetic thin layer according to the present invention cannot be obtained only in the case of the thermo magnetic recording mentioned as an example, but in the case of any other kind of high density perpendicular magnetic recording, that is, needle magnetic recording, magnetic transcription, thermo magnetic recording and the like.

Furthermore, the present invention cannot be applied to the amorphous magnetic thin layer only of the early mentioned composite of rare earth metal and iron family metal, but of other composites consisting of the above mentioned composite added with any other elements, for instance, molybdenum Mo and the like, as far as the variation of the magnetic anisotropy can be caused by laminating plural thin layers consisting of those composites.

It is preferable to apply the present invention to the laminated magnetic layer consisting of three or more thin layers in comparison with that consisting only of two thin layers, since the more thin layers that are laminated, the more stable the recorded magnetic domain which can be obtained because of the more delicate differences of the magnetic anisotropy between each thin layers.

The other effect of the compensation of the ununiformity of the recording sensitivity of the amorphous magnetic thin layer according to the covering thereof with the dielectric thin layer having the ununiform thickness can be obtained on any other magnetic recording medium used for the thermo magnetic recording. For an example, a new recording medium for which the phenomenon of the variation of refraction index in the electro-optical effect materials, for instance, bismuth silicone oxide $Bi_{12}.Si.O_{20}$, liquid crystal and the like, which variation is caused by the applied electric field, is developed and used in practice recently in order to convert a picture formed by an incoherent light into another picture formed by a coherent light. In this recording medium, the nonuniform recording sensitivity is apt to be caused by the unevenly applied electric field, so that the shading and alike injuries may occur in the converted output picture. Those injuries can be prevented also by the above compensation according to the present invention.

For another example, in the recording of the hologram, the nonuniform exposure on the photo sensitive recording medium is caused by the usual Gauss distribution of intensity of the irradiating laser beam, although the sensitivity of the recording medium is quite uniform. This case can be relieved also according to the present invention as follows. That is, it is also possible to cover the photo sensitive medium with the evaporated dielectric layer having the appropriately varied thickness. However, it is more preferable that the photo sensitive medium is once covered with another transparent photo sensitive layer, for instance photo-resist which is deposited with uniform thickness and then is irradiated by the laser beam to be used for the exposure of the recording medum and further is etched so as to remove the exposed portion thereof. As the result of the above process, the uniformity of the over-all photo sensitivity can be obtained easily also.

What is claimed is:
1. A method of forming a recording medium for magnetically recording a binary code signal comprising forming an amorphous magnetic layer consisting of at least a rare earth metal and an iron family metal, forming said amorphous magnetic layer as a plurality of thin amorphous magnetic layers stacked on each other, causing the composition ratio between the rare earth metal and the iron family metal in each of said thin layers to be different from the composition ratio in an adjacent one of said thin layers and causing the thickness of a first one of said plurality of amorphous magnetic thin layers which has a larger perpendicular magnetic anisotropy to be larger than the thickness of a second adjacent one of said amorphous magnetic thin layers which has a smaller perpendicular magnetic anisotropy, said amorphous magnetic layer enabling said recording medium to magnetically and thermally stably record a binary code signal even if the diameter of a recorded information bit is on the order of one micrometer.

2. A method of forming a recording medium as claimed in claim 1, whrein said composition ratio is caused to be different by varying a composition ratio of either a sputtering target in a sputtering production process or an evaportion source in an evaportion production process, which process is used to form said thin layers.

3. A method of forming a recording medium as claimed in claim 1, wherein said composition ratio is caused to be different by varying either a sputtering current in a sputtering production process or an evaportion velocity in an evaporation production process, which process is used to form said thin layers.

4. A method of forming a recording medium as in claim 1, further comprising the step of forming a transparent dielectric thin layer of nonuniform thickness to cover said amorphous magnetic layer.

5. A method of forming a recording medium as claimed in claim 4, wherein the thickness of said transparent dielectric thin layer is varied by keeping a substrate of said recording medium apart from an evaportion source by a required distance in an evaporation production process, which process is used to form said dielectric thin layer.

6. A method of forming a recording medium as claimed in claim 1, wherein the thickness of said transparent dielectric thin layer is varied by shifting an evaporation mask which has a required form between a substrate of said recording medium and an evaporation source in an evaporation production process, which process is used to form said dielectric layer.

* * * * *